(12) United States Patent
Inokuchi

(10) Patent No.: US 8,166,186 B2
(45) Date of Patent: Apr. 24, 2012

(54) CONTENT DISTRIBUTION METHOD, PROGRAM, AND INFORMATION PROCESSING APPARATUS

(75) Inventor: Tatsuya Inokuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 897 days.

(21) Appl. No.: 11/248,287

(22) Filed: Oct. 13, 2005

(65) Prior Publication Data

US 2006/0089997 A1 Apr. 27, 2006

(30) Foreign Application Priority Data

Oct. 26, 2004 (JP) ................................. 2004-310447

(51) Int. Cl.
*G06F 15/16* (2006.01)
(52) U.S. Cl. .................... 709/230; 709/213; 709/220
(58) Field of Classification Search .................. 709/230
See application file for complete search history.

(56) References Cited

U.S. PATENT DOCUMENTS

| | | | | | |
|---|---|---|---|---|---|
| 5,400,329 | A | * | 3/1995 | Tokura et al. ................ | 370/232 |
| 5,701,292 | A | * | 12/1997 | Chiussi et al. ................ | 370/232 |
| 6,021,116 | A | * | 2/2000 | Chiussi et al. ................ | 370/236 |
| 6,195,680 | B1 | * | 2/2001 | Goldszmidt et al. .......... | 709/203 |
| 6,275,896 | B1 | * | 8/2001 | Kojima .......................... | 711/112 |
| 6,339,785 | B1 | * | 1/2002 | Feigenbaum ................. | 709/213 |
| 6,366,761 | B1 | * | 4/2002 | Montpetit .................... | 455/12.1 |
| 6,493,336 | B1 | * | 12/2002 | Perry et al. .................... | 370/352 |
| 6,801,938 | B1 | * | 10/2004 | Bookman et al. ............. | 709/224 |
| 7,003,554 | B1 | * | 2/2006 | Turner et al. .................. | 709/217 |
| 7,047,309 | B2 | * | 5/2006 | Baumann et al. ............. | 709/232 |
| 7,058,722 | B2 | * | 6/2006 | Ikami et al. ................... | 709/231 |
| 7,272,645 | B2 | * | 9/2007 | Chang et al. .................. | 709/223 |
| 7,380,015 | B1 | * | 5/2008 | Nakajima et al. ............. | 709/232 |
| 7,555,559 | B2 | * | 6/2009 | Chapweske ................... | 709/232 |
| 7,631,098 | B2 | * | 12/2009 | Boutboul et al. ............. | 709/238 |
| 2003/0007507 | A1 | * | 1/2003 | Rajwan et al. ................ | 370/468 |

(Continued)

FOREIGN PATENT DOCUMENTS

JP 2004-015429 1/2004

(Continued)

OTHER PUBLICATIONS

Japanese Office Action issued on Nov. 11, 2010 without English translation.

*Primary Examiner* — Firmin Backer
*Assistant Examiner* — Hamza Algibhah
(74) *Attorney, Agent, or Firm* — Oblon, Spivak, McClelland, Maier & Neustadt, L.L.P.

(57) ABSTRACT

A content distribution method includes sending, by a client apparatus, distribution requests to server apparatuses via a network, the distribution requests requesting distribution of content data in a distributed manner on a packet basis; distributing, by the server apparatuses, the content data to the client apparatus in response to the distribution requests; and playing back, by the client apparatus, the content data by assembling packets distributed from the server apparatuses. The distribution requesting step includes assigning areas of each block of the content data to the server apparatuses, and sending distribution requests for the respective areas to the server apparatuses. The distributing step includes dividing the content data into blocks when distribution of the content data is requested, and distributing the areas of each block in response to the distribution requests. The playback step includes the step of reconstructing the blocks on the basis of the areas distributed from the server apparatuses.

16 Claims, 11 Drawing Sheets

U.S. PATENT DOCUMENTS

| | | | |
|---|---|---|---|
| 2003/0099202 A1* | 5/2003 | Lear et al. | 370/238 |
| 2003/0105604 A1* | 6/2003 | Ash et al. | 702/100 |
| 2003/0110206 A1* | 6/2003 | Osokine | 709/201 |
| 2003/0110229 A1* | 6/2003 | Kulig et al. | 709/207 |
| 2003/0126238 A1* | 7/2003 | Kohno et al. | 709/220 |
| 2003/0128770 A1* | 7/2003 | Chenu-Tournier et al. | 375/267 |
| 2003/0134631 A1* | 7/2003 | Snyder et al. | 455/423 |
| 2003/0149792 A1* | 8/2003 | Goldstein | 709/246 |
| 2003/0152032 A1* | 8/2003 | Yanagihara et al. | 370/236.1 |
| 2003/0154301 A1* | 8/2003 | McEachern et al. | 709/237 |
| 2003/0177187 A1* | 9/2003 | Levine et al. | 709/205 |
| 2003/0177290 A1* | 9/2003 | Ayukawa et al. | 710/10 |
| 2003/0179707 A1* | 9/2003 | Bare | 370/235 |
| 2003/0182580 A1* | 9/2003 | Lee | 713/201 |
| 2003/0187975 A1* | 10/2003 | Brown et al. | 709/224 |
| 2003/0189922 A1* | 10/2003 | Howe | 370/352 |
| 2003/0190888 A1* | 10/2003 | Mangal et al. | 455/3.05 |
| 2003/0193893 A1* | 10/2003 | Wen et al. | 370/231 |
| 2003/0195960 A1* | 10/2003 | Merriam | 709/224 |
| 2003/0206559 A1* | 11/2003 | Trachewsky et al. | 370/509 |
| 2003/0231659 A1* | 12/2003 | DiMambro et al. | 370/473 |
| 2003/0231743 A1* | 12/2003 | Laskowsky et al. | 379/27.01 |
| 2003/0233455 A1* | 12/2003 | Leber et al. | 709/226 |
| 2003/0233540 A1* | 12/2003 | Banerjee et al. | 713/153 |
| 2004/0233844 A1* | 11/2004 | Yu et al. | 370/230 |
| 2005/0105604 A1* | 5/2005 | Ito et al. | 375/225 |
| 2005/0289395 A1* | 12/2005 | Katsuyama et al. | 714/25 |
| 2006/0031537 A1* | 2/2006 | Boutboul et al. | 709/228 |
| 2006/0218222 A1* | 9/2006 | Brahmbhatt et al. | 709/201 |
| 2006/0242155 A1* | 10/2006 | Moore et al. | 707/10 |
| 2008/0133706 A1* | 6/2008 | Chavez et al. | 709/218 |

FOREIGN PATENT DOCUMENTS

| | | |
|---|---|---|
| JP | 2004-70712 | 3/2004 |
| JP | 2004-127168 | 4/2004 |
| JP | 2004-531824 | 10/2004 |
| WO | WO 02/093846 A1 | 11/2002 |

* cited by examiner

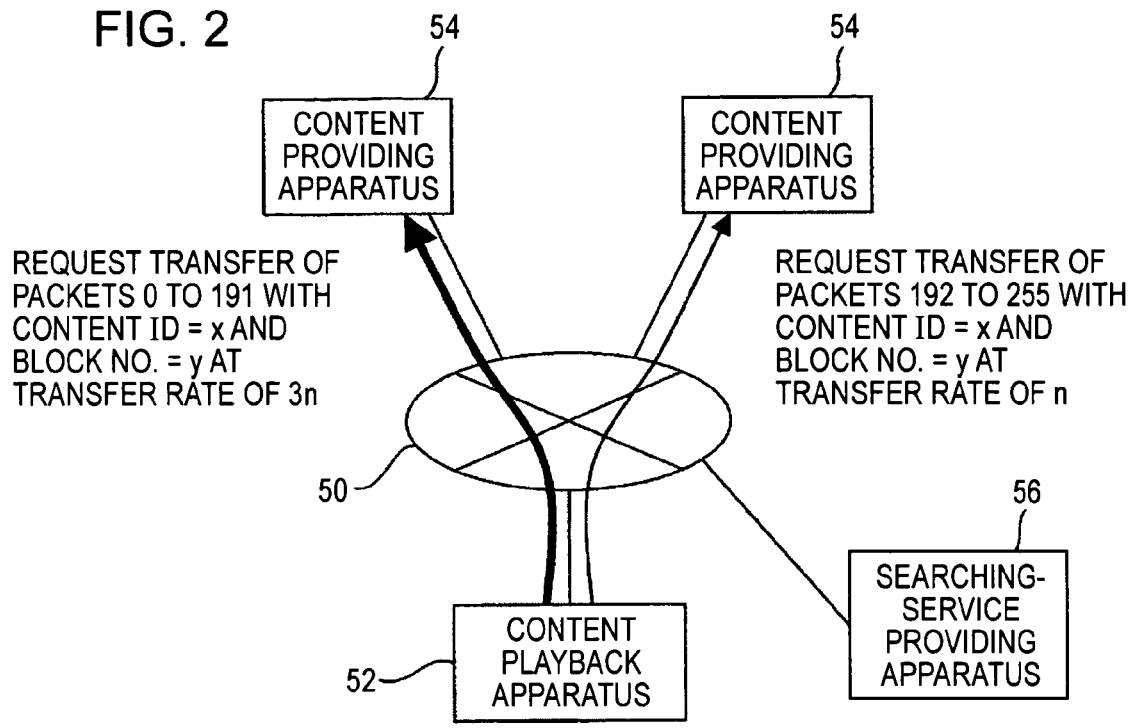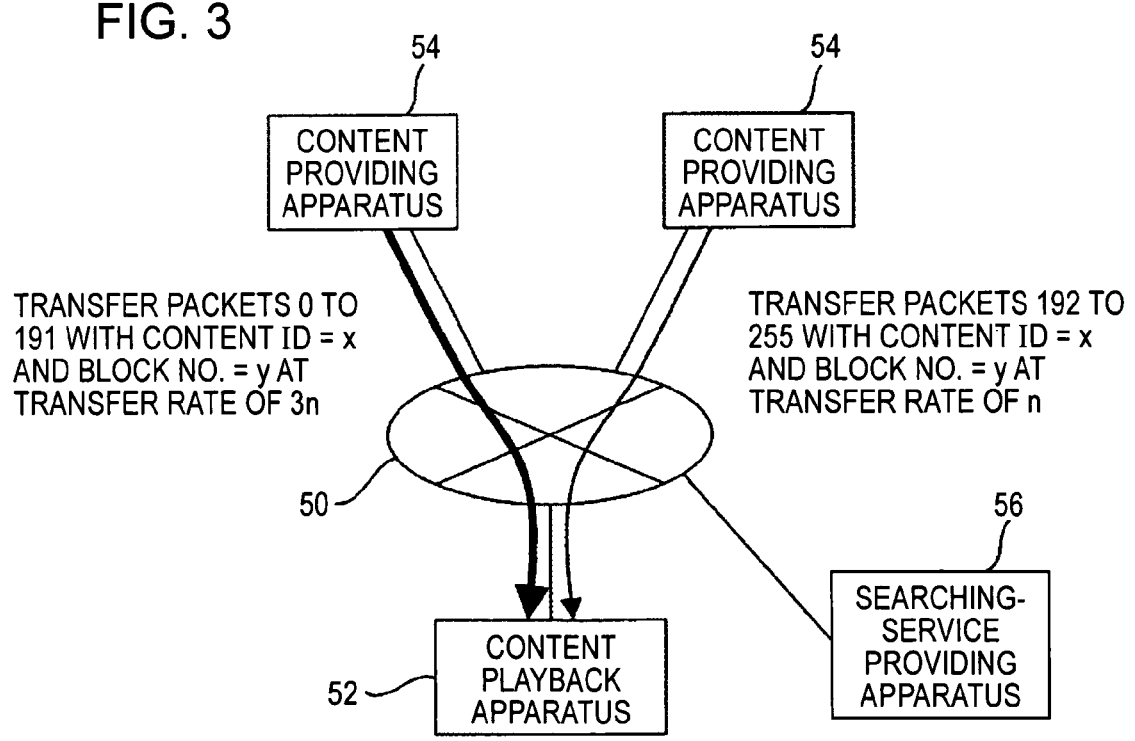

CONTENT DISTRIBUTION METHOD, PROGRAM, AND INFORMATION PROCESSING APPARATUS

CROSS REFERENCES TO RELATED APPLICATIONS

The present invention contains subject matter related to Japanese Patent Application JP 2004-310447 filed in the Japanese Patent Office on Oct. 26, 2004, the entire contents of which are incorporated herein by reference.

BACKGROUND OF THE INVENTION

1. Field of the Invention

The present invention relates to a content distribution method for distributing content data from a plurality of server apparatuses to a single client apparatus in a distributed manner, and to a program and an information processing apparatus for implementing the content distribution method.

2. Description of the Related Art

Recently, some video-on-demand (VOD) services using the Internet are available. However, since the volume of video content is large, large loads are placed on server computers and network circuits. Thus, some measures have been taken, such as degrading image quality to reduce the volume of content, providing a large number of mirror servers, or augmenting circuits near server computers or backbone circuits connected to Internet service providers (ISPs). However, users are not satisfied with low image quality of video content, and service providers and network administrators suffer huge cost of facilities for augmenting network circuits.

More recently, distributed storage environments, such as grid storage systems, are emerging. A grid storage system is a virtual storage system in which a large number of storage devices is connected via a network so that the storage devices as a whole look like a single large storage device. Grid storage systems are typically used in enterprise business environments, with each storage device located in a closed environment, such as a local area network (LAN).

Furthermore, a technology called BitTorrent, in which the scheme of grid storage is applied to an open environment such as a peer-to-peer (P2P) network, has been proposed. In an ordinary P2P network, data are exchanged on the basis of files. In contrast, in BitTorrent, a file is divided into blocks of a predetermined size, data is exchanged on the basis of the blocks, and the file is reconstructed from the blocks. BitTorrent can be considered as a grid storage system that is managed on a block basis. In BitTorrent, a plurality of host computers having a desired file is searched for over the Internet, and the plurality of host computers found by the search are simultaneously requested to send respectively different blocks of the file. This serves to achieve quick file transfer under a P2P network environment. In the case of a simple one-to-one P2P network, for example, when a host computer is connected by ADSL, the transfer rate is low since the rate of an upstream connection of an ADSL circuit is slow. Thus, the transfer rate is increased by retrieving blocks of a single file respectively from a plurality of host computers.

As methods for distributing loads of server computers and network circuits as described above, for example, according to Japanese Unexamined Patent Application Publication No. 2004-127168, packets of content data are distributed from a plurality of peers to a single peer in a P2P network so that loads of content distribution are distributed. As another example, according to Japanese Unexamined Patent Application Publication No. 2004-80307, a plurality of peers serves pieces of material data for producing programs so that the pieces of material data are available on a P2P network, and a receiving peer creates program content by retrieving the pieces of material data from the plurality of peers and combining the pieces of material data.

SUMMARY OF THE INVENTION

By using such a distributed environment for VOD, loads of server computers and network circuits are distributed, and files can be transferred quickly. However, when distributing video content, in order to maintain a high image quality, the volume of the video content amounts to the order of several Gbytes. Thus, it takes time to reconstruct the data distributed in a distributed manner, so that real-time playback is prohibited.

It is desired that a content distribution method that allows real-time playback even when a large volume of content data is distributed, and a program and an information processing apparatus for implementing the content distribution method, be provided.

According to an embodiment of the present invention, there is provided a content distribution method. The content distribution method includes the steps of sending, by a client apparatus, distribution requests to a plurality of server apparatuses via a network, the distribution requests requesting distribution of a piece of content data in a distributed manner on a packet basis; distributing, by the plurality of server apparatuses, the piece of content data to the client apparatus via the network in the distributed manner on the packet basis in response to the distribution requests sent in the distribution requesting step; and playing back, by the client apparatus, the piece of content data by assembling packets distributed in the distributed manner from the plurality of server apparatuses in the distributing step. The distribution requesting step includes the steps of assigning a plurality of areas of each of a plurality of blocks formed by dividing the piece of content data to the plurality of server apparatuses, the plurality of areas being defined by dividing each of the plurality of blocks on the packet basis in association with the plurality of server apparatuses, and sending distribution requests for the respective areas of each of the plurality of blocks formed in the block-area assigning step to the plurality of server apparatuses. The distributing step includes the steps of dividing the piece of content data into the plurality of blocks when distribution of the piece of content data is requested in the distribution requesting step, and distributing the plurality of areas of each of the plurality of blocks formed in the block dividing step, in response to the distribution requests sent in the block-area requesting step. The playback step includes the step of reconstructing the plurality of blocks on the basis of the plurality of areas distributed from the plurality of server apparatuses in the block-area distributing step.

According to another embodiment of the present invention, there is provided a program for allowing a computer to execute a method including the steps of sending distribution requests to a plurality of server apparatuses via a network, the distribution requests requesting distribution of a piece of content data in a distributed manner on a packet basis; and playing back the piece of content data by assembling packets distributed in the distributed manner from the plurality of sever apparatuses in response to the distribution requests sent in the distribution requesting step. The distribution requesting step includes the steps of assigning a plurality of areas of each of a plurality of blocks formed by dividing the piece of content data to the plurality of server apparatuses, the plurality of areas being defined by dividing each of the plurality of blocks on the packet basis in association with the plurality of server apparatuses, and sending distribution requests for the respective areas of each of the plurality of blocks formed in the block-area assigning step to the plurality of server apparatuses. The playback step includes the step of reconstructing the plurality of blocks on the basis of the plurality of areas distributed from the plurality of sever apparatuses in response to the distribution requests sent in the block-area requesting step.

According to another embodiment of the present invention, there is provided an information processing apparatus including distribution requesting means for sending distribution requests to a plurality of server apparatuses via a network, the distribution requests requesting distribution of a piece of content data in a distributed manner on a packet basis; and playback means for playing back the piece of content data by assembling packets distributed in the distributed manner from the plurality of server apparatuses in response to the distribution requests sent by the distribution requesting means. The distribution requesting means includes block-area assigning means for assigning a plurality of areas of each of a plurality of blocks formed by dividing the piece of content data to the plurality of server apparatuses, the plurality of areas being defined by dividing each of the plurality of blocks on the packet basis in association with the plurality of server apparatuses, and block-area requesting means for sending distribution requests for the respective areas of each of the plurality of blocks formed by the block-area assigning means to the plurality of server apparatuses. The playback means includes block reconstructing means for reconstructing the plurality of blocks on the basis of the plurality of areas distributed from the plurality of server apparatuses in response to the distribution requests sent by the block-area requesting means.

According to another embodiment of the present invention, there is provided a program for allowing a computer to execute a method comprising the step of receiving a distribution request from a client apparatus via a network, the distribution request requesting distribution of a part of a piece of content data on a packet basis, and distributing the part of the piece of content data to the client apparatus on the packet basis in response to the distribution request received. The distribution request includes block-area information specifying a partial area for each of a plurality of blocks formed by dividing the piece of content data. The distributing step includes the steps of dividing the piece of content data into the plurality of blocks when the distribution request is received, and distributing a part of each of the plurality of blocks formed in the block dividing step, on the basis of the block-area information.

According to another embodiment of the present invention, there is provided an information processing apparatus comprising distributing means for receiving a distribution request from a client apparatus via a network, the distribution request requesting distribution of a part of a piece of content data on a packet basis, and for distributing the part of the piece of content data to the client apparatus on the packet basis in response to the distribution request received. The distribution request includes block-area information specifying a partial area for each of a plurality of blocks formed by dividing the piece of content data. The distributing means includes block dividing means for dividing the piece of content data into the plurality of blocks when the distribution request is received, and block-area distributing means for distributing a part of each of the plurality of blocks formed by the block dividing means, on the basis of the block-area information.

According to these embodiments of the present invention, a client apparatus assigns a plurality of areas of each of a plurality of blocks formed by dividing a piece of desired content data to a plurality of server apparatuses, the plurality of areas being defined by dividing each of the blocks on a packet basis in association with the plurality of server apparatuses, and sends distribution requests for the respective areas to the plurality of server apparatuses. Furthermore, the client apparatus reconstructs the plurality of blocks on the basis of the plurality of areas distributed from the plurality of server apparatuses in response to the distribution requests. The plurality of server apparatuses divides the piece of content data into the plurality of blocks when distribution of the piece of content data is requested, and distributes, on the packet basis, the respective areas of each of the blocks when the distribution of each of the blocks is requested.

Thus, content data can be distributed by assigning respectively different areas of each block to a plurality of server apparatuses. Accordingly, content data can be distributed efficiently by assigning areas in accordance with respective transferring abilities of the plurality of server apparatuses. Furthermore, each block can be managed on a packet basis. Thus, when a packet is lost, the lost packet can be retransmitted more quickly than by performing a retry. This allows efficient distribution of each block and therefore quick distribution of content data. Accordingly, even when a large volume of content, such as high-quality video content, is distributed, real-time playback is allowed.

BRIEF DESCRIPTION OF THE DRAWINGS

FIG. 2 is a schematic diagram showing the configuration of the content distribution system according to the embodiment;

FIG. 3 is a schematic diagram showing the configuration of the content distribution system according to the embodiment;

DESCRIPTION OF THE PREFERRED EMBODIMENTS

In a content distribution system, a piece of content data is distributed in a distributed manner via a network from a plurality of server apparatuses to a client apparatus. The client apparatus assigns a plurality of areas of each of a plurality of blocks formed by dividing the piece of content data to the plurality of server apparatuses, the plurality of areas being defined by dividing each of the blocks on a packet basis in association with the plurality of server apparatuses, and sends distribution requests for the respective areas of each of the blocks to the plurality of server apparatuses. Furthermore, the client apparatus reconstructs the plurality of blocks on the basis of the plurality of areas distributed from the plurality of server apparatuses on the packet basis in response to the distribution requests. The plurality of server apparatuses, upon receiving the distribution requests for distribution of the piece of content data, divides the piece of content data into the plurality of blocks, and distributes, on the packet basis, the respective areas of each of the blocks. The client apparatus monitors the respective transferring abilities of the plurality of server apparatuses for each of the blocks, and assigns larger areas of each of the blocks to server apparatuses with higher transferring abilities.

Now, a content distribution system according to an embodiment of the present invention will be described with reference to the drawings.

In the content distribution system according to the embodiment, a plurality of sever apparatuses distributes a piece of content data to a client apparatus over a network in a distributed manner on a packet basis. The content data is composed of, for example, a file of computer application or the like, or audio and image stream data.

Figure 1:
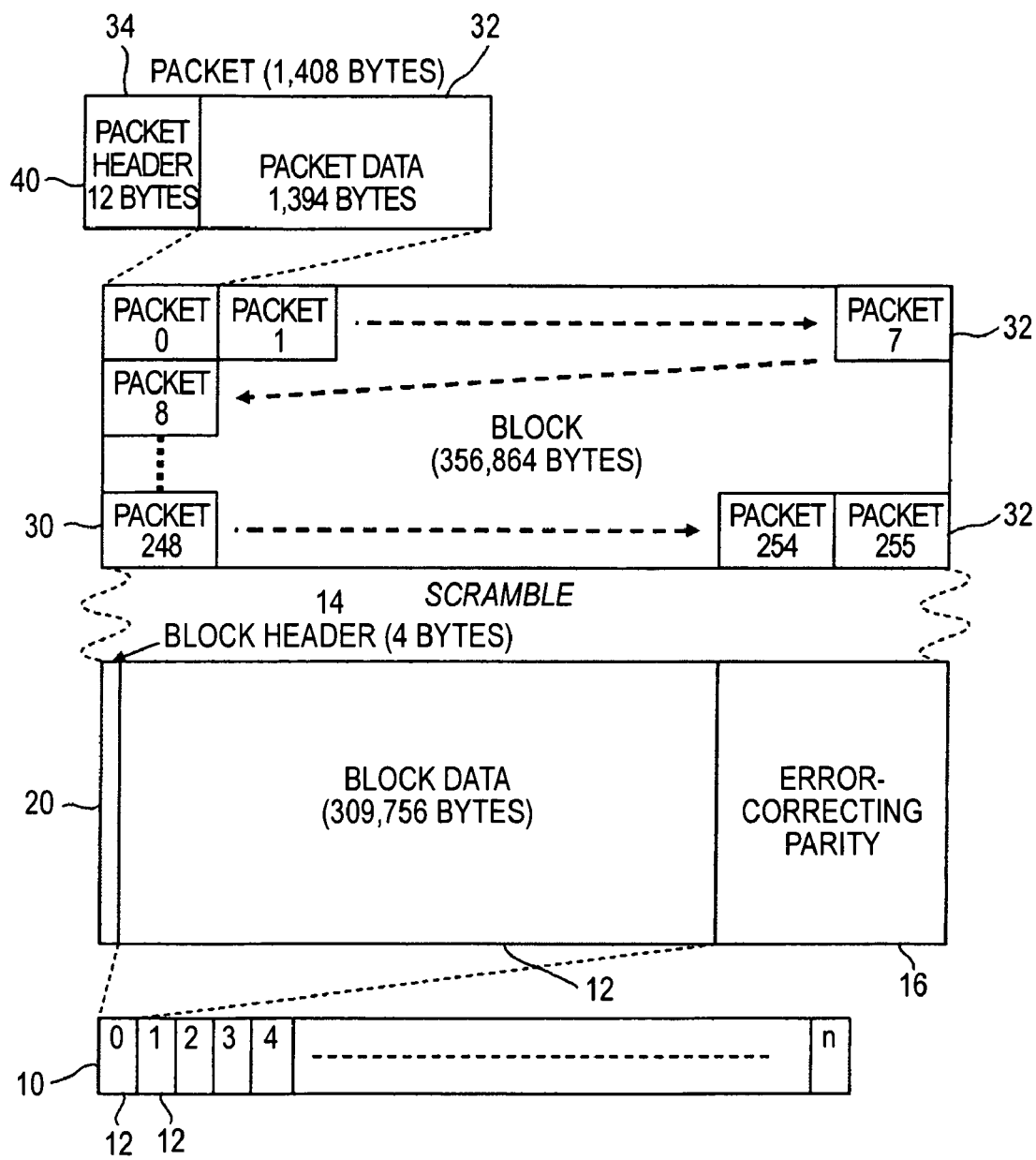
FIG. 1 is a diagram showing a structure of content data that is distributed by a content distribution system according to an embodiment of the present invention.

FIG. 1 is a diagram showing a structure of content data that is distributed by the content distribution system according to this embodiment.

Referring to FIG. 1, content data 10 is divided into a plurality of blocks 12 each composed of 309,756 bytes. The respective blocks 12 are assigned block numbers in ascending order from the beginning, which are attached as 4-byte block headers 14 before the respective blocks 12. Furthermore, error-correcting parities 16 are attached after the respective blocks 12, whereby blocks 20 of 356,864 bytes are formed. The blocks 20 are transformed into blocks 30 so that the error-correcting parities 16 are distributed. Each of the blocks 30 is divided into 256 packets each composed of 1,394 bytes. The respective packets 32 are assigned packet numbers 0 to 255 in ascending order from the beginning. Before each of the packets 32, a 12-byte packet header 34 including a content ID, a block number, and a packet number is attached, whereby a packet 40 is formed. The packets 40 are sent onto a network.

The data lengths of the blocks 12, the packets 40, and so forth are not limited to the lengths described above. The error-correcting parities 16 are used when some packets 40 are lost by error, delay, or being discarded on a transferring path, for calculating data of the lost packets 40 and perform error correction at a client apparatus so that retries can be avoided as much as possible.

FIGS. 2 and 3 are diagrams showing a schematic configuration of the content distribution system according to this embodiment.

Referring to FIGS. 2 and 3, the content distribution system according to this embodiment includes a content playback apparatus (client apparatus) 52, content providing apparatuses (server apparatuses) 54, and a searching-service providing apparatus 56, these apparatuses being connected to a network 50.

The content playback apparatus 52 is implemented, for example, by a personal computer or a portable information terminal. The content providing apparatuses 54 and the searching-service providing apparatus 56 are implemented, for example, by personal computers. The network 50 is implemented, for example, by the Internet or a wireless network.

In FIGS. 2 and 3, for simplicity of description, one content playback apparatus 52, two content providing apparatuses 54, and one searching-service providing apparatus 56 are shown. Actually, however, a huge number of content playback apparatuses 52 exists on the network 50, and a large number of content providing apparatuses 54 and a large number of searching-service providing apparatuses 56 exist on the network 50.

Referring to FIG. 2, the content playback apparatus 52 sends to the two content providing apparatuses 54 distribution-request data for distributing desired content data 10 in a distributed manner on a packet basis, assembles packets 40 distributed in a distributed manner from the two content providing apparatuses 54 in response to the distribution-request data, and plays back the content data 10.

More specifically, the content playback apparatus 52 issues requests for distribution of the content data 10 (i.e., sends block-area request data) for each block 30 so that the content data 10 is distributed in a distributed manner. The content playback apparatus 52 monitors the respective transferring abilities of the content providing apparatuses 54, such as transfer rates or error rates, during distribution of the content data 10, and sets the numbers of packets 32 (packets 40) of each block that the respective two content providing apparatuses 54 are to be requested to distribute in accordance with the transferring abilities. The content playback apparatus 52 divides the block 30 and assigns areas of the block 30 to the respective two content providing apparatuses 54 on the basis of the numbers of packets. Furthermore, the content playback apparatus 52 sets respective transfer rates of the two content providing apparatuses 54 for each block 30 on the basis of the numbers of packets. The content playback apparatus 52 generates block-area request data by attaching a content ID and a block number to information representing the respective areas and transfer rates, and sends the block-area request data to the respective content providing apparatuses 54.

For example, to a first content providing apparatus 54, the content playback apparatus 52 sends block-area request data for distributing, at a transfer rate of 3n, packets 40 with packet numbers 0 to 191 of a block with a block number y of a piece of content with a content ID X, and to a second content providing apparatus 54, the content playback apparatus 52 sends block-area request data for distributing, at a transfer rate of n, packets 40 with packet numbers 192 to 255 of the block with the block number y of the piece of content with the content ID X.

Furthermore, the content playback apparatus 52 reconstructs the block 12 on the basis of the two areas transmitted from the two content providing apparatuses 54 in accordance with the block-area request data, and plays back the content data 10.

As shown in FIG. 3, each of the content providing apparatuses 54 divides a part of the content data 10 into packets 40 on the basis of the distribution-request data from the content playback apparatus 52, and distributes the packets 40 to the content playback apparatus 52.

More specifically, the content providing apparatuses 54, upon receiving a distribution request from the content playback apparatus 52, divides the content data 10 into a plurality of blocks 12. Furthermore, the content providing apparatus 54, upon receiving block-area request data from the content playback apparatus 52, attaches a block header 20 and an error-correcting parity 16 to each block 12 to form a block 20, performs scrambling to transform the block 20 into a block 30, and divides the block 30 into 256 packets. The content providing apparatus 54 attaches packet headers 34 to packets 32 of an area specified by packet numbers in the block-area request data to form packets 40, and distributes the packets 40 to the content playback apparatus 52 at a transfer rate specified in the block-area request data or a transfer rate that is most approximate to the transfer rate.

For example, on the basis of block-area request data for distributing, at a transfer rate of 3n, packets 40 with packet numbers 0 to 191 of a block with a block number y of a piece of content with a content ID X, a first content providing apparatus 54 distributes the packets 40 to the content playback apparatus 52, and on the basis of block-area request data for distributing, at a transfer rate of n, packets 40 with packet numbers 192 to 255 of the block with the block number y of the piece of content with the content ID X, a second content providing apparatus 54 distributes the packets 40 to the content playback apparatus 52.

The searching-service providing apparatus 56 stores a search database 85 (shown in FIG. 6) in which content data that can be distributed by each of a large number of content providing apparatuses 54 is registered so that content providing apparatuses 54 having registered content data can be searched for. Upon receiving from the content playback apparatus 52 a searching request for searching for content providing apparatuses 54 having desired content data, the searching-service providing apparatus 56 searches the search database 85 for content providing apparatuses 54 having the desired content data, creates list information of the content providing apparatuses 54 found by the search, and distributes the list information to the content playback apparatus 52.

The content playback apparatus 52 selects content providing apparatuses 54 that are to be requested to distribute the content data 10 on the basis of the list information distributed from the searching-service providing apparatus 56, and sends distribution requests to the content providing apparatuses selected.

Figure 4:
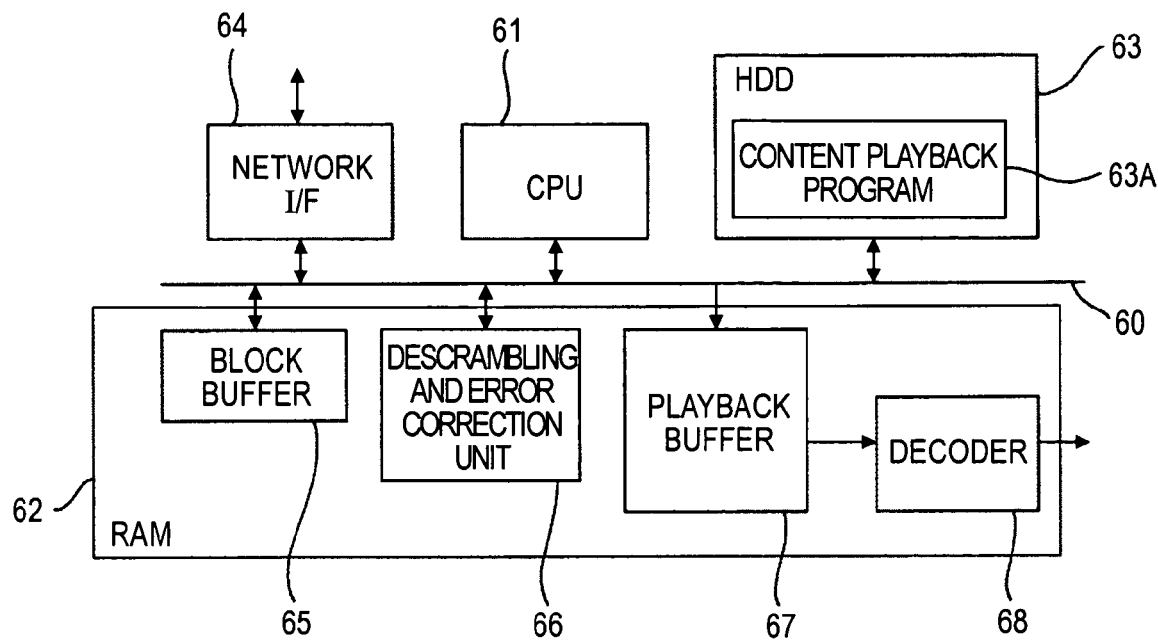
FIG. 4 is a diagram showing the configuration of a content playback apparatus shown in FIGS. 2 and 3.

FIG. 4 is a diagram showing the configuration of the content playback apparatus 52 shown in FIGS. 2 and 3.

Referring to FIG. 4, the content playback apparatus 52 is implemented, for example, by a personal computer, and it includes a central processing unit (CPU) 61, a random-access memory (RAM) 62, a hard disk drive (HDD) 63, and a network interface (I/F) 64, these components being connected to each other via a bus 60.

The network I/F 64 is connected, for example, to the Internet. On the HDD 64, a content playback program 63A for using distribution of content data 10 is installed. The content playback apparatus 52 activates the content playback program 63A to receive distribution of content data 10.

When the content playback program 63A is activated by the CPU 61, a block buffer 65, a descrambling and error correction unit 66, a playback buffer 67, and a decoder 68 are formed in the RAM 62.

The block buffer 65 accumulates packets 40 received via the network I/F 64 and reconstructs a block 30. The descrambling and error correction unit 66 performs descrambling on the block 30 reconstructed in the block buffer 65 to transform the block 30 into a block 20, and performs error correction of the block 12 based on an error-correcting parity 16 of the block 20. The playback buffer 67 accumulates the block 12 for which error correction has been performed by the descrambling and error correction unit 66. The decoder 68 decodes compressed content data 10, such as MPEG data. The decoder 68 decodes data of the block 12 accumulated in the playback buffer 67, in accordance with a playback timing of the content data 10.

Figure 5:
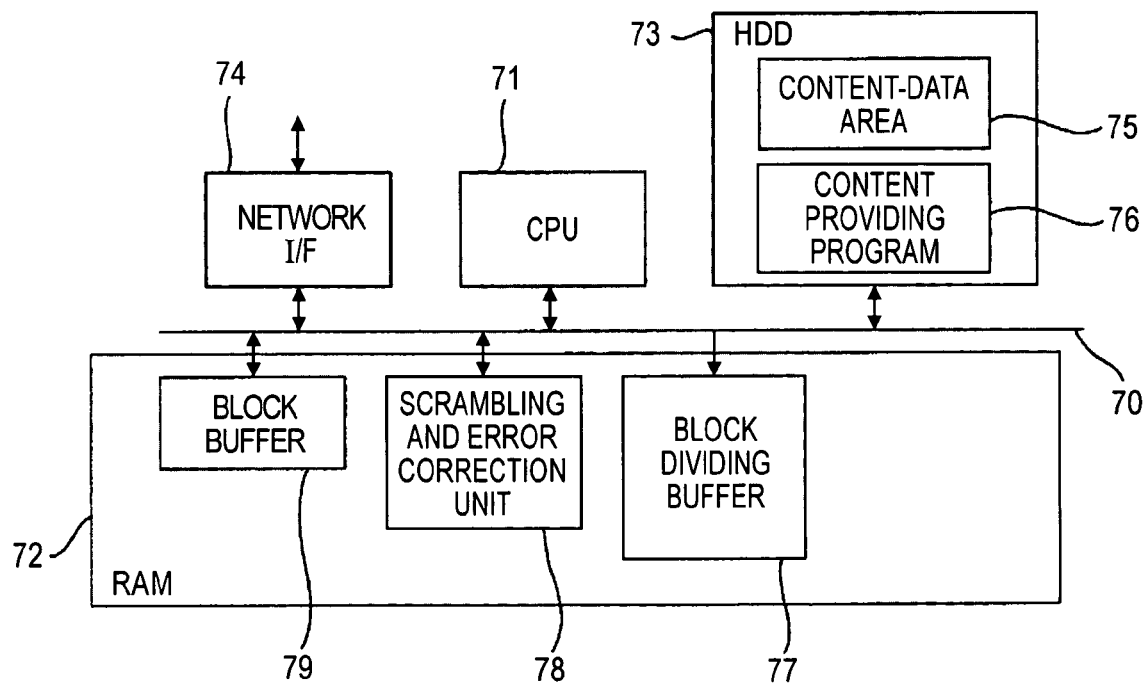
FIG. 5 is a diagram showing the configuration of content providing apparatus shown in FIGS. 2 and 3.

FIG. 5 is a diagram showing the configuration of the content providing apparatus shown in FIGS. 2 and 3.

Referring to FIG. 5, the content providing apparatus 54 is implemented, for example, by a personal computer, and it includes a CPU 71, a RAM 72, an HDD 73, and a network I/F 74, these components being connected to each other via a bus 70.

The network I/F 74 is connected to the Internet. On the HDD 73, a content-data area 75 storing a large number of pieces of content data 10 is provided, and a content providing program 76 for distributing the content data 10 in the content-data area 75 is installed. The content providing apparatus 54 activates the content providing program 76 to distribute the large number of pieces of content data 10 in the content-data area 75.

When the content providing program is activated by the CPU 71, a block dividing buffer 77, a scrambling and error correction unit 78, and a block buffer 79 are formed in the RAM 72.

The block dividing buffer 77 divides content data 10 that is to be distributed, read from the content-data area 75 of the HDD 73, into a plurality of blocks 12. The scrambling and error correction unit 78 forms a block 20 by attaching a block header 12 and an error-correcting parity 16 to a block 12 formed in the block dividing buffer 77, and performs scrambling to transform the block 20 into a block 30. The block buffer 79 divides the block 30, yielded through scrambling by the scrambling and error correction unit 78, into 256 packets 32, and attaches packet headers 34 to the packets 32 to form packets 40. The packets 40 are read from the block buffer 79 in accordance with a transfer rate that is set according to a block-area request by the content playback apparatus 52, and is sent onto the Internet via the network I/F 74.

Figure 6:
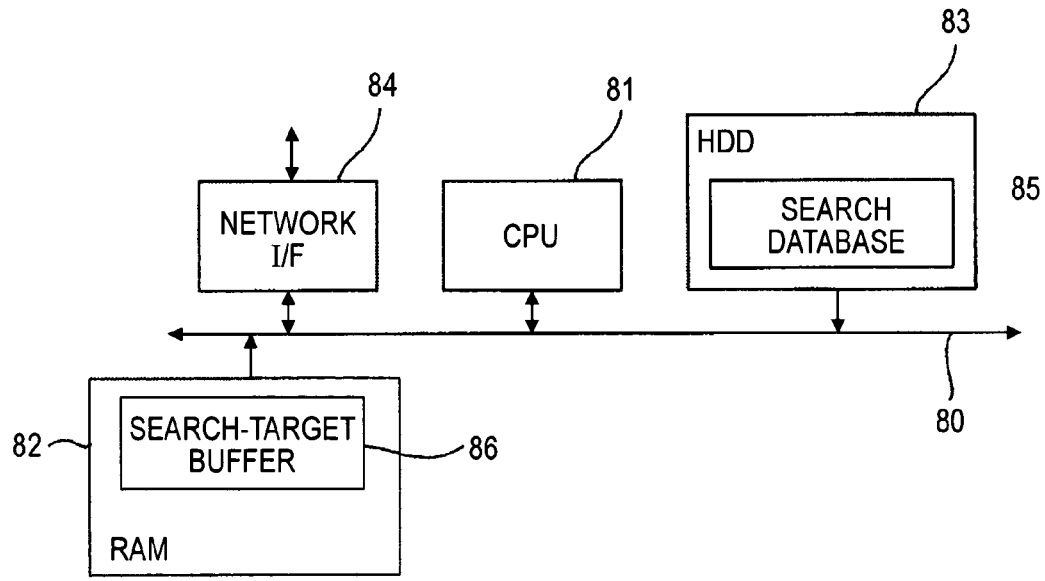
FIG. 6 is a diagram showing the configuration of a searching-service providing apparatus shown in FIGS. 2 and 3.

FIG. 6 is a diagram showing the configuration of the searching-service providing apparatus 56 shown in FIGS. 2 and 3.

Referring to FIG. 6, the searching-service providing apparatus 56 is implemented, for example, by a personal computer, and it includes a CPU 81, a RAM 82, an HDD 83, and a network I/F 84, these components being connected to each other via a bus 80.

The network I/F 84 is connected to the Internet. On the HDD 83, a search database 85 is stored. The search database 85 includes a data area in which pieces content data 10 are associated with content providing apparatuses 54, and a program for executing searching.

When the search database is activated by the CPU 81, a search-target buffer 86 is formed in the RAM 82. In the search-target buffer 86, information regarding content providing apparatuses 54 found by the search (e.g., IDs of the content providing apparatuses 54, transfer rates of the content providing apparatuses 54, and so forth) is accumulated to create list information. The list information created in the search-target buffer 86 is sent onto the Internet via the network I/F 84.

In the content distribution system according to this embodiment, different areas of the block 30 specified by packet numbers are assigned respectively to a plurality of content providing apparatuses 54, and the packets 40 are distributed at the respective transfer rates of the plurality of content providing apparatuses 54. In the content playback apparatus 52, the respective transferring abilities of the plurality of content providing apparatuses 54 are monitored for each block 30, and the transferring rates and areas of the block 30 are changed on the basis of the results of monitoring.

Figure 7:
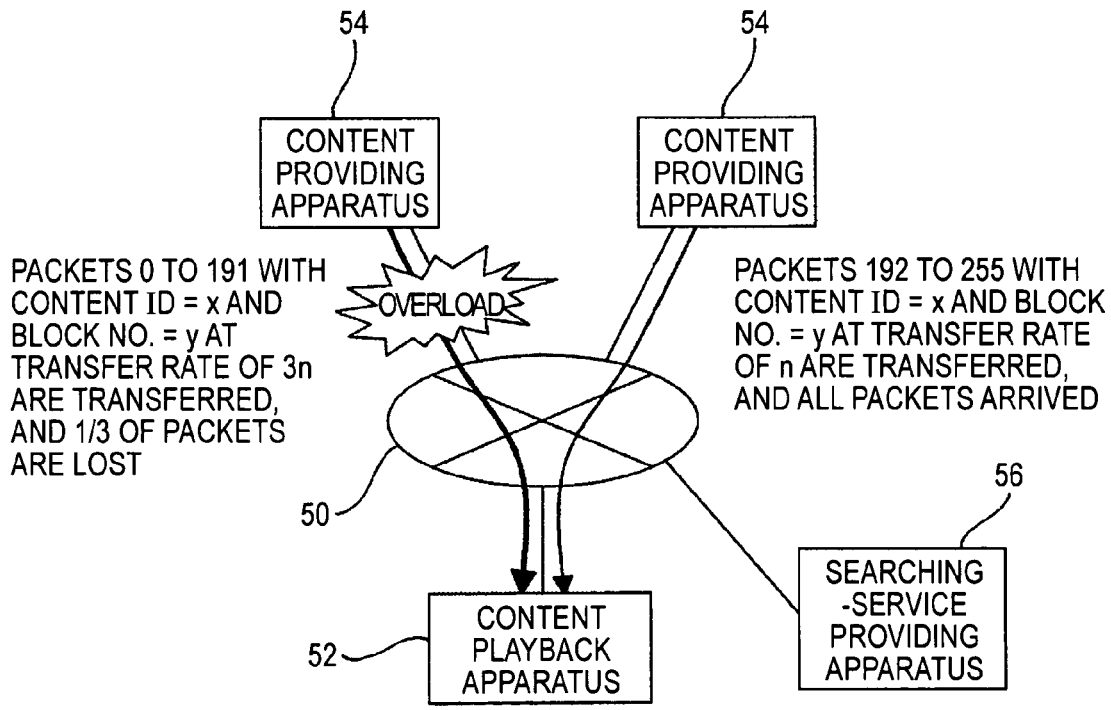
FIG. 7 is a diagram showing an example of a situation where transfer rates are to be changed.

FIG. 7 is a diagram showing an example of a situation where transfer rates are to be changed.

Referring to FIG. 7, let it be supposed that a first content providing apparatus 54 distributes packets 40 in the area of packet numbers 0 to 191 of a block 12 at a transfer rate of 3n, resulting in loss of ⅓ of the packets 40, and that a second content providing apparatus 54 distributes packets 40 in the area of packet numbers 192 to 255 of the block 12 at a transfer rate of n, resulting in successful arrival of all the packets 40. In this case, it is determined that the first content providing apparatus 54 is overloaded. Thus, the transfer rate of the first content providing apparatus 54 is decreased to so that a smaller area will be assigned, and the transfer rate of the second content providing apparatus 54 is increases so that a larger area will be assigned. Then, loss of packets 40 with the first content providing apparatus 54 is alleviated, so that the packets 40 can be distributed efficiently by the two content providing apparatuses 54.

Figure 8:
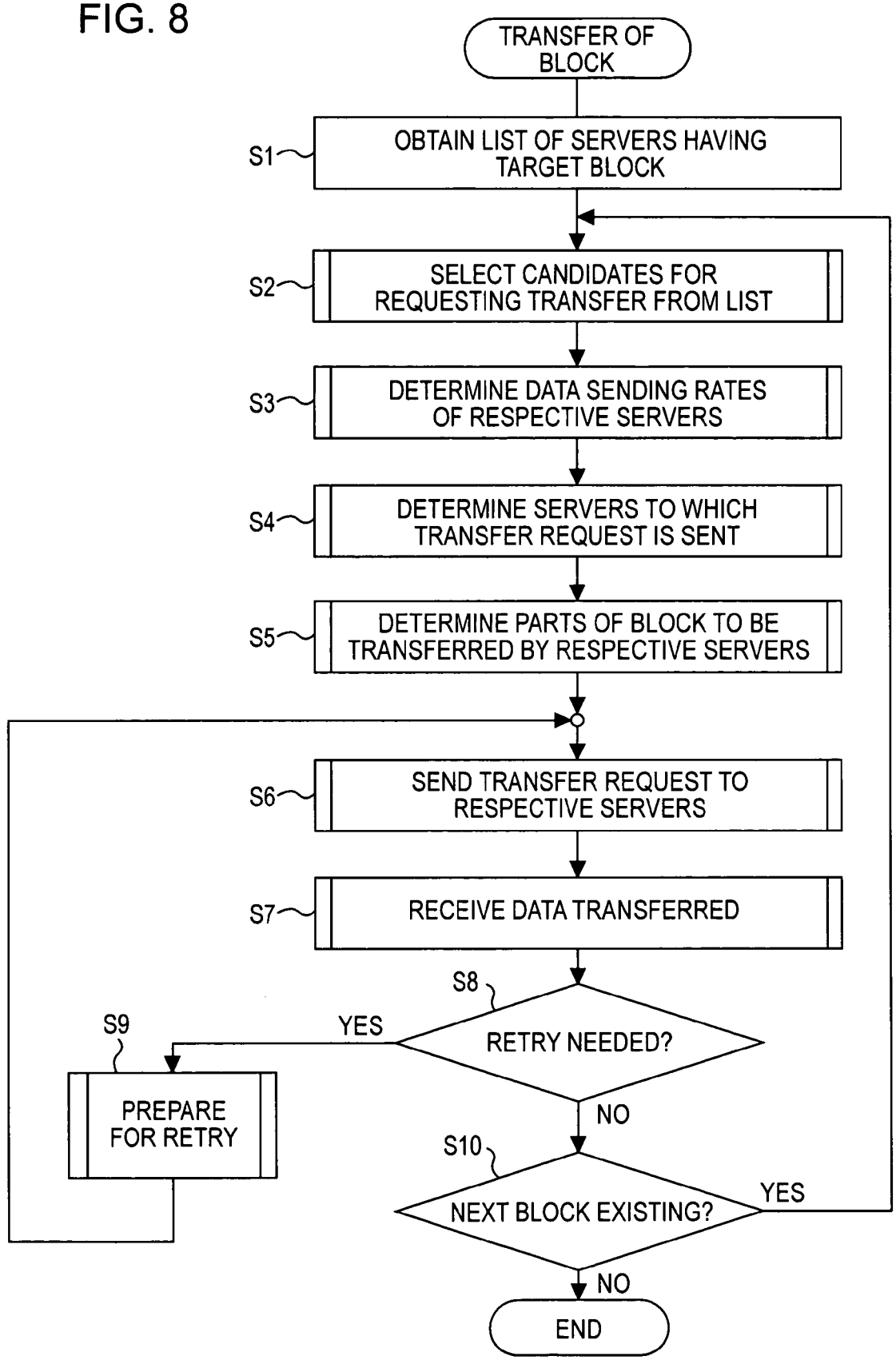
FIG. 8 is a flowchart of an operation of the content distribution system according to the embodiment.

FIG. 8 is a flowchart of an operation of the content distribution system according to this embodiment.

In this embodiment, content data 10 composed of stream data including audio data and image data, such as a movie, is distributed. Since the volume of the content data 10 is large, transfer of the content data 10 is started from the beginning thereof, and blocks 30 that have been transferred are played back in real time while the remaining blocks of the content data 10 are being transferred. The following description deals with an operation of transferring a single block 30.

First, in step S1, the content playback apparatus 52 sends to the searching-service providing apparatus 56 a searching request for searching for content providing apparatuses 54 that possess desired content data 10, and in response to the searching request, the searching-service providing apparatus 56 distributes list information to the content playback apparatus 52, whereby the content playback apparatus 52 obtains the list information. Then, in step S2, the content playback apparatus 52 selects candidates of content providing apparatuses 54 that are requested to distributed the content data 10, from content providing apparatuses 54 included in the list information.

Then, in step S3, the content playback apparatus 52 sets requested transfer rates on the basis of transfer rates, included in the list information, of the selected candidates of content providing apparatuses 54. Then, in step S4, the content playback apparatus 52 sets a total transfer rate of content providing apparatuses 54 that will be actually requested to distribute the content data 10, and transfer rates for actual requests are assigned to the candidates of content providing apparatuses 54 with priority in descending order of the transfer rates set in step S3. Then, in step S5, areas of the block 30 are assigned on the basis of packet numbers to the content providing apparatuses 54 to which the transfer rates for actual requests are assigned with priority in step S4. Then, in step S6, the content playback apparatus 52 sends block-area request data (a content ID, a block number, area information, a transfer rate, and so forth) to each of the content providing apparatuses 54.

Then, in step S7, the content providing apparatuses 54 sends packets 40 of the areas of the block 30 to the content playback apparatus 52 at their respective transfer rates, in accordance with the respective block-area request data, and the content playback apparatus 52 accumulates the packets 40 distributed separately in the block buffer 65 of the RAM 62 and reassembles the packets 40 to reconstruct the block 30, executes descrambling and error correction in the descrambling and error correction unit 66, and repeatedly attempts to extract block data 12. When the extraction succeeds, the block data 12 is buffered in the playback buffer 67.

While the buffering is taking place, in step S8, it is monitored whether a timeout is caused by unarrived packets 40 of the block 30. When a timeout is detected in step S8, the process proceeds to step S9, in which a retry process for the packets 40 is executed. The process then returns to step S6. When all the packets 40 of the block 30 are received and the block 30 is reconstructed in step S7 or when unarrived packets 40 are recovered by error correction and the block 30 is reconstructed in step S7, the process proceeds to step S10, in which the block data 12 of a block 20 buffered in the playback buffer 67 is decoded by the decoder 68 in accordance with timing of playback so that the decoded data is played back. When a next block 30 exists, the process returns to step S2. When no next block 30 exists, the process is exited. In the content playback apparatus 52, when playback of content is to be started, the playback rate of the content data 10 is compared with the rate of accumulating data in the playback buffer 67, and playback of the content data 10 is started when an amount of data that is sufficient to endure rate variation has been accumulated.

Figure 9:
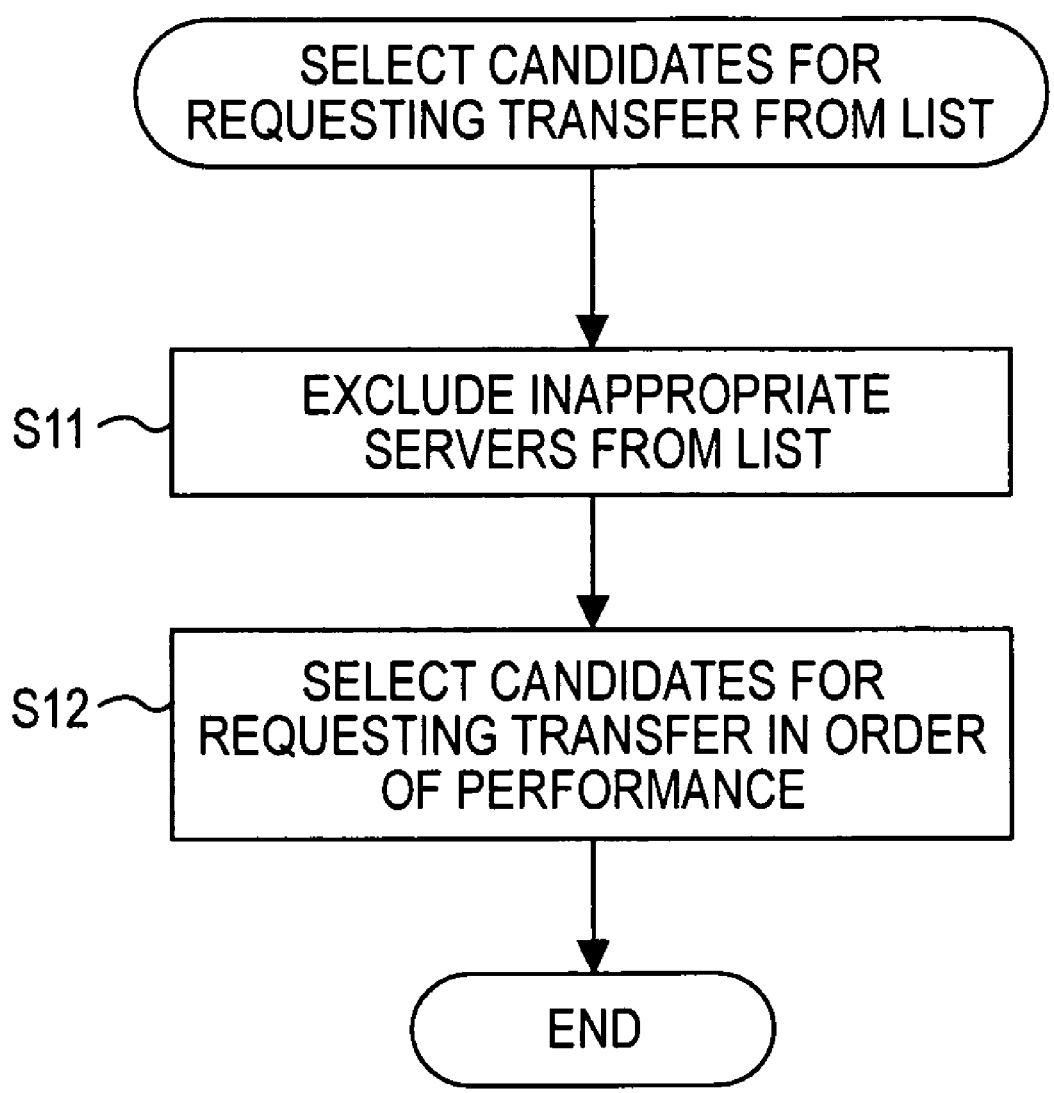
FIG. 9 is a flowchart showing an example of step S2 shown in FIG. 8.

FIG. 9 is a flowchart of an example of step S2 shown in FIG. 8.

In step S2, first, in step S11, inappropriate content providing apparatuses 54 are excluded on the basis of the list information. Then, in step S12, content providing apparatuses as candidate for requesting distribution of content data 10 are selected in order of high transfer rate from the remaining content providing apparatuses 54.

Since the number of packets of the block 30 is 256, the number of content providing apparatuses to which distribution requests can be sent is limited to 256. Actually, considering overheads of exchanging transfer requests or the like, it is not efficient to assign a very small number of packets to a single content providing apparatus 54. Thus, assuming that at least 16 packets 40 are assigned to a single content providing apparatus 54, it is possible to send distribution requests to 256/16=16 content providing apparatuses 54. For example, when 1,000 content providing apparatuses 54 are included in the list information, approximately 20 candidates of content providing apparatuses 54, including reserve candidates, are selected.

In step S11, for example, when a content providing apparatus 54 repeats error-free transfer and 100% loss at a transfer rate of 10 Mbps during transfer of a previous block 30, it is assumed that the circuit condition is not stable, and the content providing apparatus 54 is excluded from candidates.

In step S12, for example, when the content data 10 is distributed, content providing apparatuses 54 with favorable transfer records, i.e., high transfer rates and stable distribution, during transfer of the previous block 30 are selected with priority. In the case of the first block with block number 0, since no transfer record exists, for example, when communication information is exchanged for NAT traversal before distribution of the block 30, candidates are selected on the basis of information representing quality of the communication, such as response time or error rate of the packets 40 or the number of routers on the transfer path. When information that can be used for selecting candidates is not available, candidates are selected on the basis of an appropriate factor, such as an order of retrieval.

The content playback apparatus 52 can be configured so that, for example, the transfer rate or error rate of the last block during distribution of previous content data 10 is stored in the HDD 63 as a part of the content playback program 63A. In step S12, for example, when candidates for the first block 30 with block number 0 are selected, candidates are selected on the basis of the transfer rate or error rate of the previous transfer, stored in the HDD 63. When the transfer rate or error rate of the previous transfer is not stored, candidates can be selected on the basis of transfer rates included in the list information.

Figure 10:
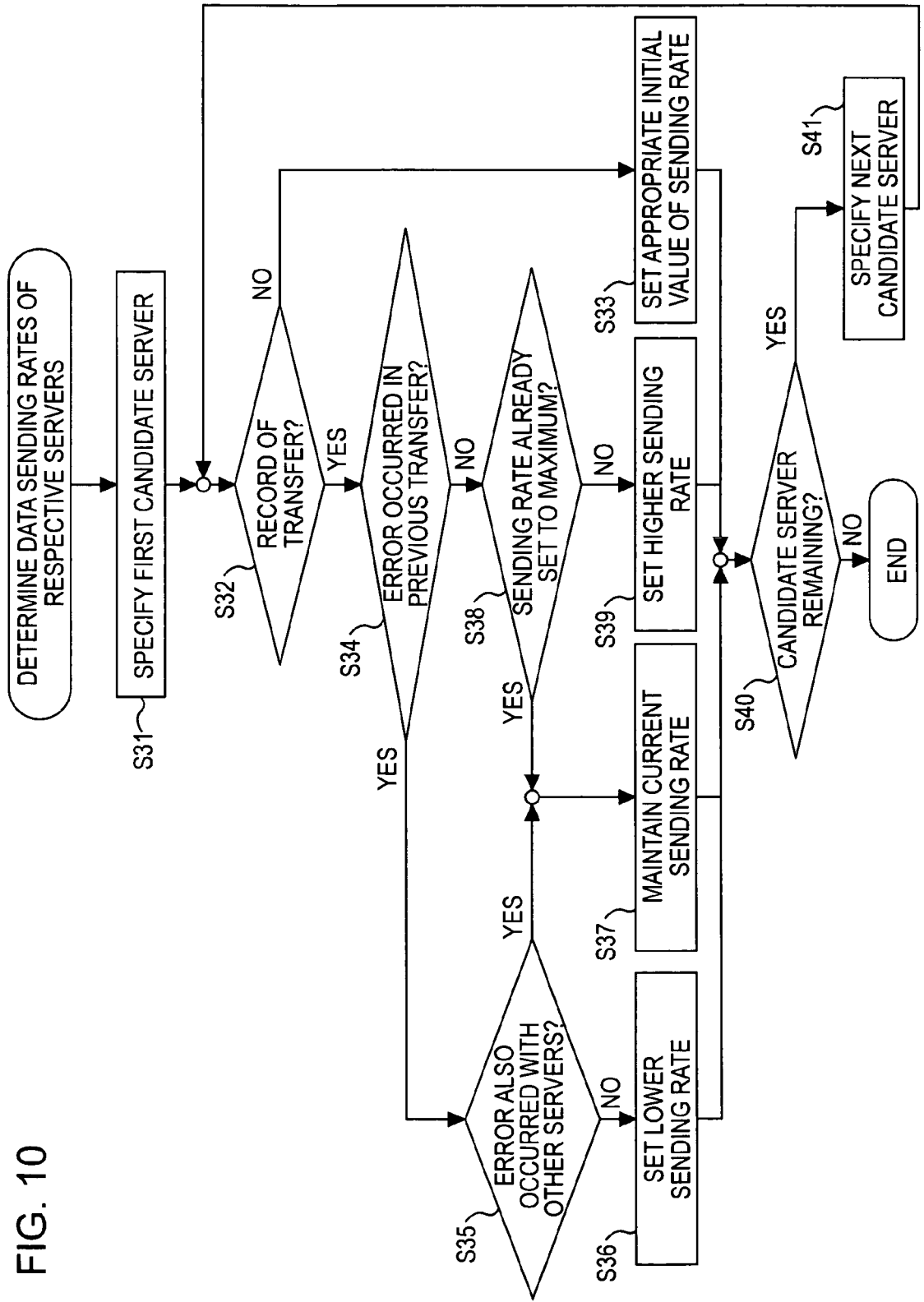
FIG. 10 is a flowchart showing an example of step S3 shown in FIG. 8.

FIG. 10 is a flowchart of an example of step S3 shown in FIG. 8.

In step S3, first, in step S31, the first candidate content providing apparatus 54 selected with priority in step S12 is chosen. In step S32, it is checked whether a transfer record of the content providing apparatus 54 exists. When no transfer record exists (when step S32 results in NO), the process proceeds to step S33, in which an appropriate initial value, for example, a transfer rate that is approximately half the transfer rate included in the list information, is set.

When a transfer record exists (when step S32 results in YES), the process proceeds to step S34, in which it is checked whether an error occurred during distribution of the previous block 30. When it is determined that an error occurred, the process proceeds to step S35, in which it is checked whether errors also occurred with other content providing apparatuses 54. When it is determined that errors did not occur, the process proceeds to step S36, in which a transfer rate that is lower than the transfer rate for the previous block 30 is set. When it is determined in step S35 that errors also occurred with other content providing apparatuses 54, the process proceeds to step S37, in which the same transfer rate as the transfer rate for the previous block 30 is set.

When it is determined in step S34 that no error occurred during distribution of the previous block 30, the process proceeds to step S38, in which it is checked whether the transfer rate of the content providing apparatus 54 for the previous block 30 is already set to a maximum transfer rate of the content providing apparatus 54 (e.g., the transfer rate included in the list information). When the transfer rate for the previous block 30 is already set to the maximum transfer rate, the process proceeds to step S37. When it is determined in step S38 that the transfer rate for the previous block 30 is not set to the maximum transfer rate, the process proceeds to step S39, in which a transfer rate that is higher than the transfer rate for the previous block 30 is set.

Then, in step S40, it is checked whether a next candidate content providing apparatus 54 exists. When a next candidate content providing apparatus 54 exists (when step S40 results in YES), the process proceeds to step S41, in which a next candidate content providing apparatus 54 is specified. The process then returns to step S32. When no next candidate content providing apparatus 54 exists (when step S40 results in NO), the process is exited to proceed to step S4 shown in FIG. 8.

For example, when a transfer rate of 3 Mbps is assigned to the first content providing apparatus 54 for the previous block 30 and no error (packet loss or data error) occurs during distribution of the previous block 30, it is possible that the ability of the content providing apparatus 54 is not fully used, so that the transfer rate is increased, for example, to 4 Mbps. Furthermore, when a transfer rate of 3 Mbps is assigned to the second content providing apparatus 54 for the previous block 30 and errors occur in 10% of the packets 40, the transfer rate is decreased, for example, to 2 Mbps. However, when errors on the order of 10% also occur with other content providing apparatuses 54, a measure is taken in step S4, so that the transfer rate of 3 Mbps is maintained in step S3.

Figure 11:
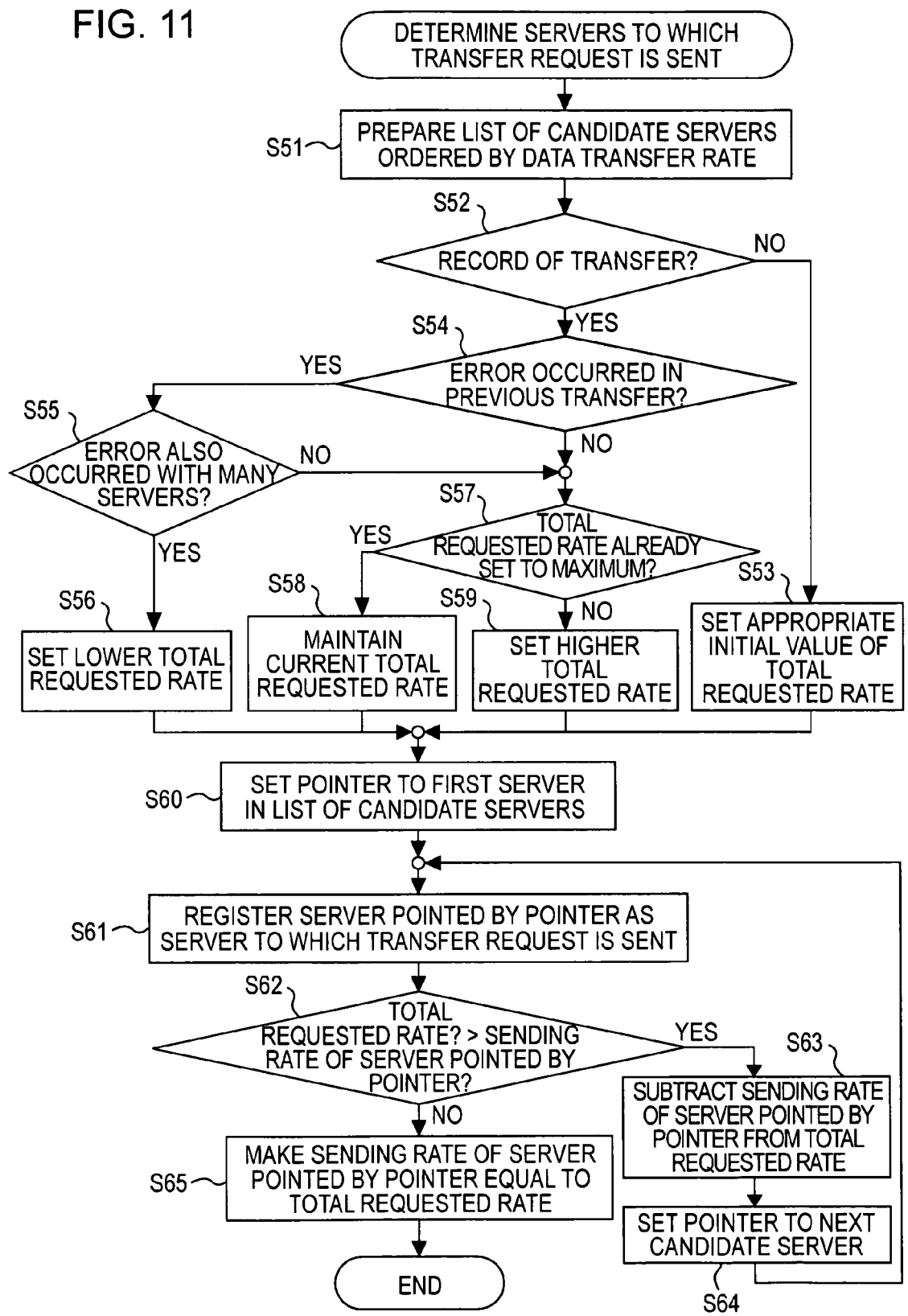
FIG. 11 is a flowchart showing an example of step S4 shown in FIG. 8.

FIG. 11 is a flowchart showing an example of step S4 shown in FIG. 8.

In step S4, first, in step S51, a list is created in which the content providing apparatuses 54 selected as candidates in step S3 are arranged in descending order of transfer rate. Then, in step S52, a transfer record of the content playback apparatus 52 is detected. When no transfer record exists, the process proceeds to step S53, in which the total transfer rate of content providing apparatuses 54 to which distribution is actually requested is set on the basis of the playback rate of content data.

When a transfer record of the content playback apparatus 52 is detected in step S52, the process proceeds to step S54, in which it is checked whether an error occurred during distribution of the previous block 30. When it is determined in step S54 that an error occurred, the process proceeds to step S55, in which it is checked whether errors also occurred with many other candidate content providing apparatuses 54. When it is determined that errors also occurred with many other candidate content providing apparatuses 54, the process proceeds to step S56, in which a total transfer rate that is lower than the total transfer rate for the previous block 30 is set.

When it is determined in step S55 that errors did not occur with many other candidate content providing apparatuses 54 or when it is determined in step S54 that an error did not occur during distribution of the previous block 30, the process proceeds to step S57, in which it is checked whether the total transfer rate is already set to the maximum transfer rate. When it is determined in step S57 that the transfer rate is set to the maximum transfer rate, the process proceeds to step S58, in which the same total transfer rate as the total transfer rate for the previous block 30 is set. When it is determined in step S57 that the transfer rate is not set to the maximum transfer rate, the process proceeds to step S59, in which a total transfer rate that is higher than the total transfer rate for the previous block 30 is set.

Then, in step S61, a pointer is set to the first candidate content providing apparatus 54 in order of high priority in the list created in step S51. Then, in step S62, the content providing apparatus 54 is registered as a content providing apparatus 54 to which distribution is actually requested.

Then, in step S62, the transfer rate of the registered content providing apparatus 54 specified by the pointer is compared with the total transfer rate set in step S53, step S56, step S58, or step S59. When the total transfer rate is greater than the transfer rate of the registered content providing apparatus 54, the process proceeds to step S63, in which the transfer rate of the registered content providing apparatus 54 is subtracted from the total transfer rate. Then, in step S64, the pointer is set to a next candidate content providing apparatus 54. The process then returns to step S61.

When the total transfer rate is less than the transfer rate of the registered content providing apparatus 54, the process proceeds to step S65, in which the transfer rate of the registered content providing apparatus 54 is set as the total transfer rate. The process is then exited to proceed to step S5.

For example, when the respective transfer rates of three content providing apparatuses 54 are 4 Mbps, 10 Mbps, and 2 Mbps, priority is given in order of 10 Mbps, 4 Mbps, and 2 Mbps. When the playback rate of content data 10 is 3 Mbps, for example, a total transfer rate of 8 Mbps or greater is allocated considering overheads and retries. However, for example, when the maximum effective rate of the circuit of the content playback apparatus 52 is 15 Mbps, if a transfer at a transfer rate of 15 Mbps or greater is requested, loss of packets 40 occurs. Thus, candidates are selected in order of high priority until the transfer rate of 15 Mbps is achieved. In the case of the above example, the content providing apparatuses 54 with the transfer rates of 10 Mbps and 4 Mbps are selected as content providing apparatuses 54 to which distribution is actually requested. Furthermore, the content providing apparatus 54 with the transfer rate of 2 Mbps is also selected as a content providing apparatus 54 to which distribution is actually requested, but actually a transfer rate of 1 Mbps is assumed for this content providing apparatus 54. However, when errors occurred with substantially all the content providing apparatuses 54 during transfer of the previous block 30, it is assumed that the effective rate of the circuit of the content playback apparatus 52 has decreased, so that the total transfer rate is reduced. For example, when the total transfer rate is reduced to 10 Mbps, only the content providing apparatus 54 with the transfer rate of 10 Mbps is selected.

Figure 12:
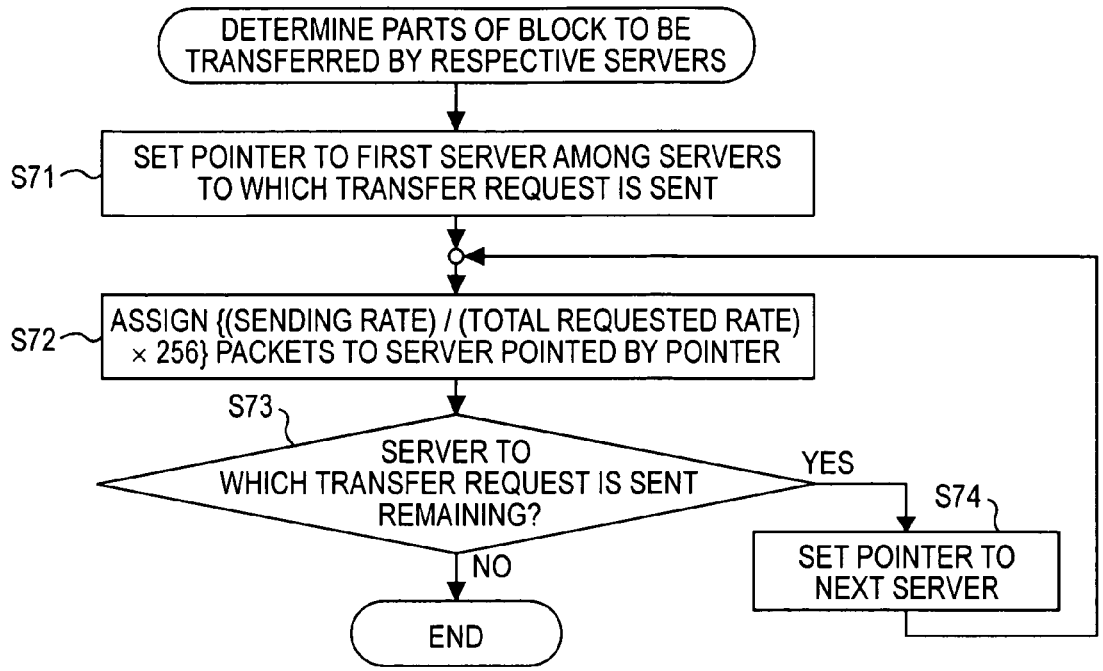
FIG. 12 is a flowchart showing an example of step S5 shown in FIG. 8.

FIG. 12 is a flowchart showing an example of step S5 shown in FIG. 8.

In step S5, first, in step S71, a pointer is set to the first content providing apparatus 54 in order of high priority from the content providing apparatuses 54 selected in step S4. Then, in step S72, a number of packets is assigned to the content providing apparatus 54 specified by the pointer, in accordance with the ratio of the transfer rate of the content providing apparatus 54 to the total transfer rate, and packet numbers are sequentially assigned to the packets from the beginning of the block 30 (step S72). Then, in step S73, it is checked whether a next content providing apparatus 54 exists. When a next content providing apparatus 54 exists (when step S73 results in YES), the process proceeds to step S74, in which the pointer is set to the next content providing apparatus 54. The process then returns to step S72. When no next content providing apparatus 54 exists (when step S73 results in NO), the process is exited to proceed to step S6.

For example, when the packets of the block 30 are assigned to two content providing apparatuses 54 by a ratio of 3 to 1 as shown in FIGS. 2 and 3, the area of the packets with packet numbers 0 to 191 is assigned to one of the content providing apparatuses 54, and the area of the packets with packet numbers 192 to 255 is assigned to the other content providing apparatus 54.

Figure 13:
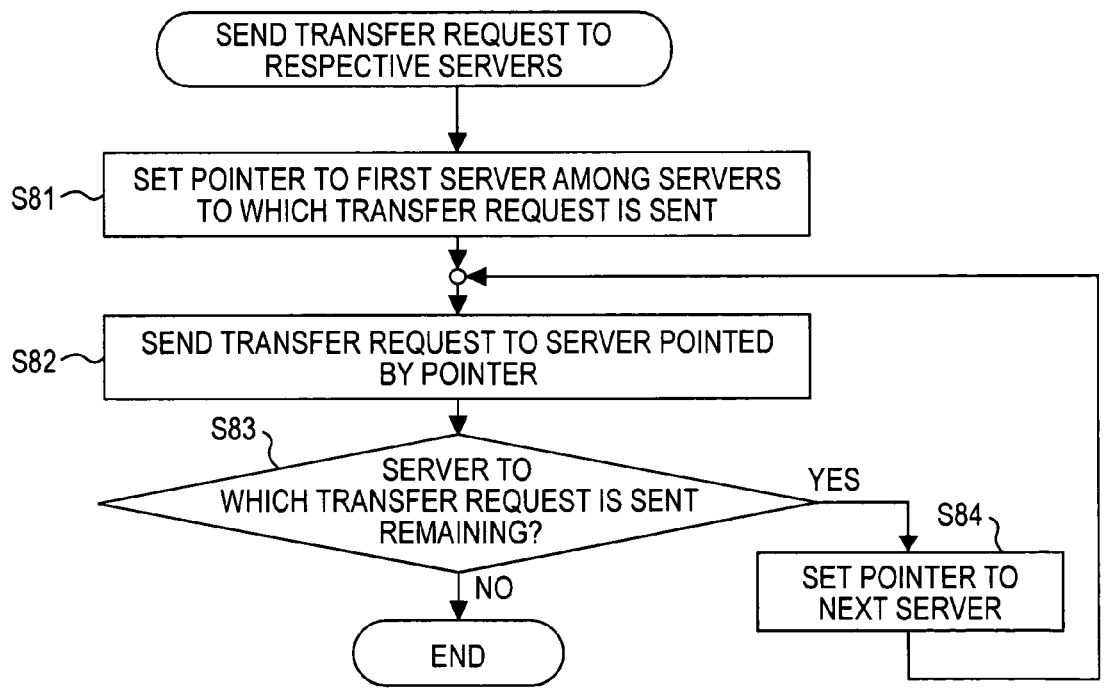
FIG. 13 is a flowchart showing an example of step S6 shown in FIG. 8.

FIG. 13 is a flowchart showing an example of step S6 shown in FIG. 8.

In step S6, first, in step S81, a pointer is set to the first content providing apparatus 54 in order of high priority from the content providing apparatuses 54 to which the areas of the block 30 are assigned. Then, in step S82, a block-area request is sent to the content providing apparatus 54 specified by the pointer. Then, in step S83, it is checked whether a next content providing apparatus 54 exists. When it is determined that a next content providing apparatus 54 exists (when step S83 results in YES), the process proceeds to step S84, in which the pointer is set to the next content providing apparatus 54. The process then returns to step S82. When no next content providing apparatus 54 exists (when step S83 results in NO), the process is exited to proceed to step S7.

Each of the content providing apparatuses 54 adjusts the intervals of distribution of the packets 40 so that the transfer rate specified in the block-area request is achieved.

Figure 14:
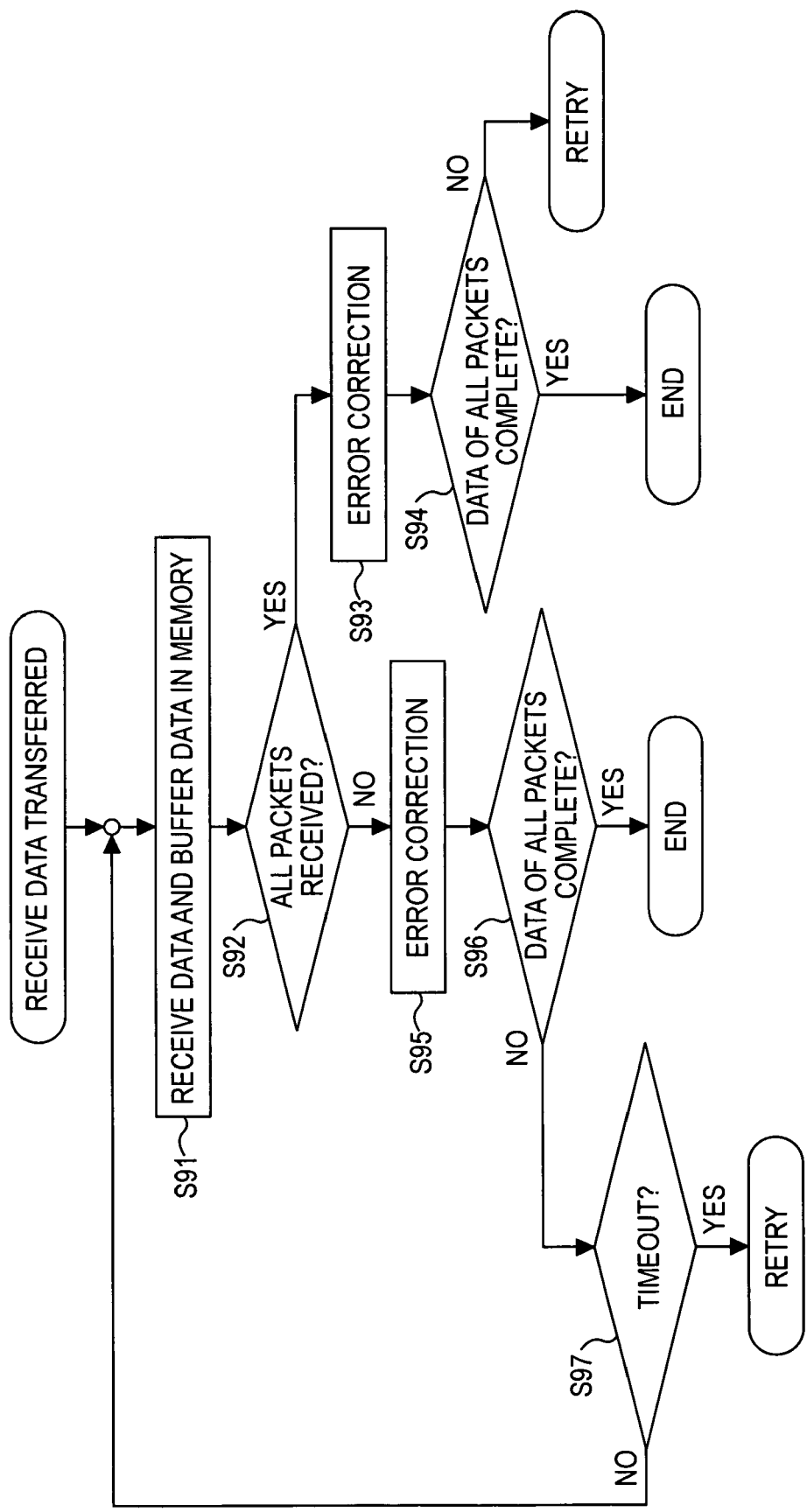
FIG. 14 is a flowchart showing an example of step S7 shown in FIG. 8.

FIG. 14 is a flowchart showing an example of step S7 shown in FIG. 8.

In step S7, first, in step S91, in the content playback apparatus 52, the packets 40 distributed separately are accumulated in the block buffer 65 of the RAM 62. Then, in step S92, it is checked whether all the packets 40 of the block 30 have been accumulated. When it is determined in step S92 that all the packets 40 have been accumulated, the process proceeds to step S93, in which error correction is executed. Then, in step S94, it is checked whether all the packets are complete. When it is determined that all the packets 40 are complete, the process is exited to proceed to step S10. When it is determined in step S94 that some packets are not complete, the process proceeds to a retry process in step S9.

When it is determined in step S92 that some packets 40 of the block 30 have not arrived, the process proceeds to step S95, in which error correction is executed. Then, in step S96, it is checked whether all the packets 40 are complete. When it is determined that all the packets 40 are complete, the process is exited to proceed to step S10. When it is determined in step S96 that some packets 40 are not complete, the process proceeds to step S97, in which it is checked whether a timeout has occurred. When a timeout has not occurred, the process returns to step S91. When it is determined in step S97 that a timeout has occurred, the process proceeds to a retry process in step S9. As described above, even when unarrived packets 40 exist, the block 30 can be reconstructed by error correction.

Figure 15:
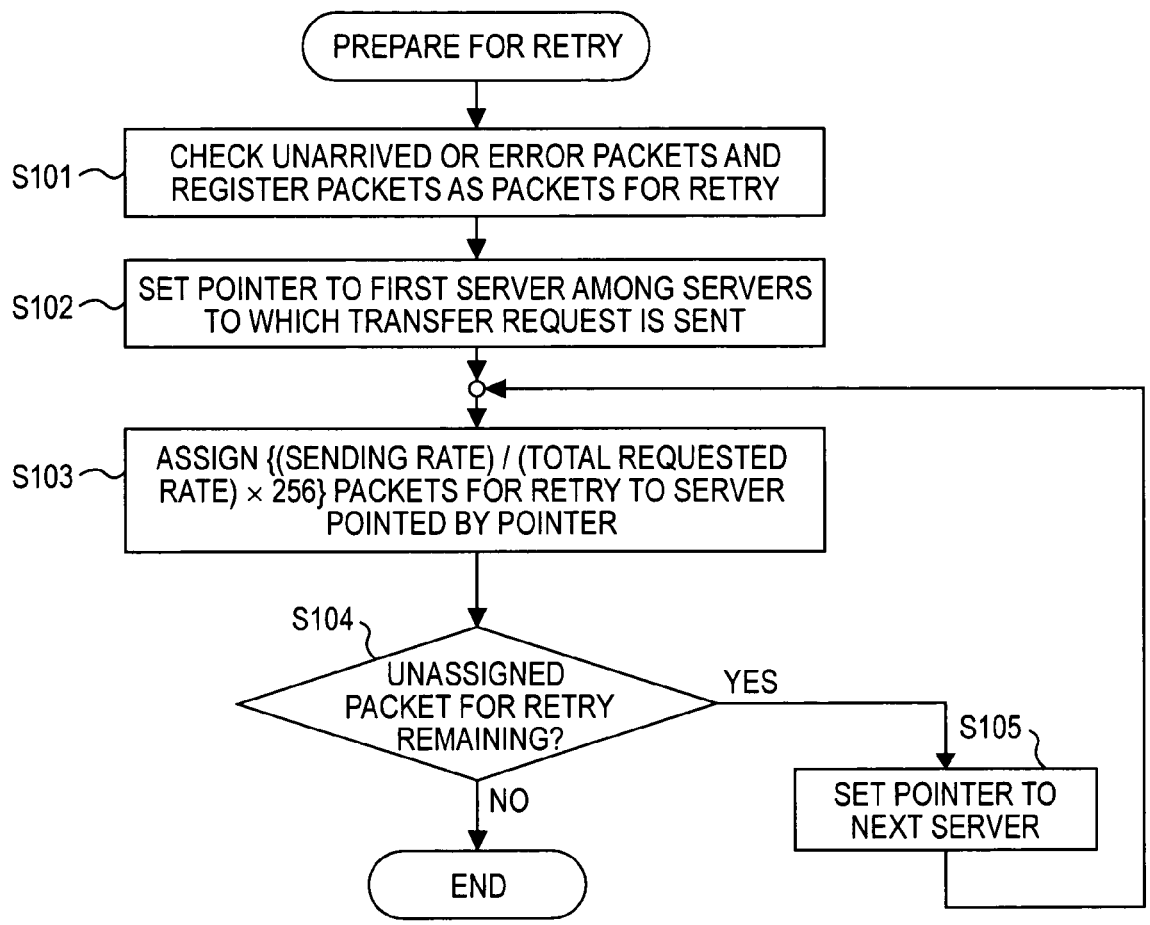
FIG. 15 is a flowchart showing an example of step S9 shown in FIG. 8.

FIG. 15 is a flowchart showing an example of step S9 shown in FIG. 8.

In step S9, first, in step S101, unarrived or error packets 40 are registered as packets 40 for retry. Then, in step S102, a pointer is set to a content providing apparatus 54 with a highest priority. Then, in step S103, the packets 40 for retry, registered in step S101, are assigned to the content providing apparatus 54 specified by the pointer so that the number of the packets 40 assigned does not exceed the number of packets assigned in step S72, and a block-area request specifying an area on the basis of packet numbers is sent again. Then, in step S104, it is checked whether packets 40 for retry that have not been retransmitted are remaining. When packets 40 for retry are remaining, the process proceeds to step S105, in which the pointer is set to a content providing apparatus 54 with a next highest priority. The process then returns to step S103. When it is determined in step S104 that no packets 40 for retry are remaining, the retry process is exited.

As described above, in the retry process, when packets 40 for retry exist, regardless of the content providing apparatus 54 that distributed the packets 40 for retry, retransmission is requested to content providing apparatuses 54 with high priority that allow stable distribution. Thus, transfer errors of the packets 40 retransmitted can be reduced. Accordingly, the packets 40 can be distributed efficiently, and the block 30 can be reconstructed quickly.

According to the embodiment described above, when distributing content data 10, areas of a block 30 are assigned in accordance with the respective transferring abilities of a plurality of content providing apparatuses 54. Thus, the loads on the content providing apparatuses 54 and network circuits can be distributed efficiently. Furthermore, since the content data 10 is temporally divided into a plurality of blocks 30, stream data such as a movie can be distributed reliably. Since each block 30 is composed of a block 12 and an error correcting parity 16, the effect of transfer errors of packets 40 can be alleviated. Furthermore, the content playback apparatus 52 controls bandwidths by setting a total transfer rate and respective transfer rates of the content providing apparatuses 54 for each block 30. Thus, the amounts of traffic on network circuits of the content playback apparatus 52 and the content providing apparatuses can be maintained appropriately relative to the capacities of the network circuits (neither too congested nor too sparse), so that the distributed loads of the network circuits can be minimized. Accordingly, content data 10 of a large volume, such as high-quality video content, can be played back in real time.

It should be understood by those skilled in the art that various modifications, combinations, sub-combinations and alterations may occur depending on design requirements and other factors insofar as they are within the scope of the appended claims or the equivalents thereof.

What is claimed is:

1. A content distribution method, comprising:
sending distribution requests by a client apparatus to a plurality of server apparatuses via a network, the distribution requests requesting distribution of a piece of content data in a distributed manner on a packet basis;
distributing the piece of content data by the plurality of server apparatuses to the client apparatus via the network in the distributed manner on the packet basis in response to the distribution requests sent in the sending distribution requests; and
playing back the piece of content data by the client apparatus by assembling packets distributed in the distributed manner from the plurality of server apparatuses in the distributing the piece of content data;
wherein the sending distribution requests includes
dividing the piece of content data into a plurality of blocks,
dividing a block of the plurality of blocks into a plurality of packets,
defining a plurality of areas of the block, each area of the plurality of areas being a subset of packets of the plurality of packets,
assigning each area of the plurality of areas to a server apparatus of the plurality of server apparatuses,
specifying a respective transfer rate individually for each of the plurality of areas, the specifying the including setting a transfer rate for each server apparatus to transfer each area,
transmitting the distribution requests for respective areas of each of the plurality of blocks specifying the respective transfer rate individually for each area to the server apparatus assigned to each area to minimize distributed loads of network circuits,
detecting a ratio of packets received at the client apparatus to total packets sent by a corresponding server apparatus,
decreasing a transfer rate of the corresponding server apparatus to a non-zero transfer rate if the ratio detected for the corresponding server apparatus falls below a threshold, and
reassigning only some of the areas assigned to the corresponding server apparatus to another server apparatus if the transfer rate of the corresponding server apparatus is decreased and maintaining another portion of the areas assigned to the corresponding server apparatus,
the distributing the piece of content data includes
dividing the piece of content data into the plurality of blocks in response to a request for distribution of the piece of content data,
dividing each block of the plurality of blocks into the plurality of packets,
setting a transfer rate to the respective transfer rate specified in the distribution request, and
distributing the packets contained in the plurality of areas of each of the plurality of blocks, in response to the distribution requests sent in the transmitting the distribution requests, and
the playing back includes reconstructing the plurality of blocks on the basis of the packets contained in the plurality of areas distributed from the plurality of server apparatuses in the distributing the packets contained in the plurality of areas.

2. The content distribution method according to claim 1, wherein the assigning each area assigns the areas to the plurality of server apparatuses in proportion to the respective transfer rates of the plurality of server apparatuses.

3. The content distribution method according to claim 1, wherein the transmitting the distribution requests reports the respective transfer rates set in the setting respective transfer rates to the associated server apparatuses when sending the distribution requests for the respective areas, and
the distributing the packets distributes the plurality of areas on the basis of the transfer rates reported in the transmitting the distribution requests.

4. The content distribution method according to claim 1, wherein the setting respective transfer rates detects numbers of routers located between the client apparatus and respective server apparatuses before the plurality of areas of each of the plurality of blocks are distributed in the distributing the packets, and sets the respective transfer rates of the plurality of server apparatuses on the basis of the numbers of routers detected in relation to the respective server apparatuses.

5. The content distribution method according to claim 1, wherein the sending distribution requests includes detecting communication-quality information at the client apparatus including both transfer rates and error rates of communication information when the communication information is sent from the client apparatus and subsequently returned to the client apparatus from at least one member of the plurality of server apparatuses before the plurality of areas of each of the plurality of blocks are distributed in the distributing the packets, and
the setting respective transfer rates sets the respective transfer rates of the plurality of server apparatuses on the basis of the communication-quality information detected.

6. The content distribution method according to claim 1,
wherein the sending distribution requests includes detecting communication-quality information including either transfer rates or error rates, or both transfer rates and error rates, for the respective areas distributed by the plurality of server apparatuses in the distributing the packets, and
wherein the setting respective transfer rates sets the respective transfer rates of the plurality of server apparatuses on the basis of the detected communication-quality information for respective server apparatuses.

7. The content distribution method according to claim 1,
wherein the sending distribution requests includes detecting communication-quality information including either transfer rates or error rates, or both transfer rates and error rates, for the respective areas distributed by the plurality of server apparatuses in the distributing the packets, and
the setting respective transfer rates sets a total transfer rate of the plurality of server apparatuses on the basis of the detected communication-quality information of the server apparatuses.

8. The content distribution method according to claim 1, wherein the playing back further includes:
storing in a storage unit on the client apparatus the respective transfer rates set for the plurality of server apparatuses used in a previous distribution of content data by respective server apparatuses; and
the setting respective transfer rates sets the respective transfer rates of the plurality of server apparatuses on the basis of the transfer rates of the plurality of servers for the previous distribution of content data stored in the storage unit.

9. The content distribution method according to claim 1, wherein the sending distribution requests further includes:
requesting distribution of search information from a searching-service providing apparatus of a plurality of server apparatuses having a piece of desired content data, the searching-service providing apparatus including means for storing database information representing association between a plurality of server apparatuses and pieces of content data that are distributable by respective server apparatuses, means for receiving a searching request for searching for the piece of content data from the client apparatus via the network, means for searching for a plurality of server apparatuses capable of distributing the pieces of content data, on the basis of the database information stored in the means for storing, in response to the searching request received by the means for receiving a searching request, and means for distributing search information retrieved by the means for searching to the client apparatus via the network;

obtaining the search information distributed from the searching-service providing apparatus in response to the distribution request sent in the requesting distribution of search information; and selecting a plurality of server apparatuses that is to be requested to distribute the piece of content data, on the basis of the obtained search information, wherein the sending distribution requests includes sending the distribution requests to the selected plurality of server apparatuses.

10. The content distribution method according to claim 1, wherein the dividing the piece of content data into a plurality of blocks includes attaching error-correcting codes to respective blocks, the defining a plurality of areas includes dividing the error-correcting codes together with the respective blocks, into a plurality of areas on the packet basis in association with the plurality of server apparatuses, the reconstructing the plurality of blocks reconstructs the blocks with the error-correcting codes attached, on the basis of the plurality of areas, and the playing back further includes performing error correction of the plurality of blocks on the basis of the reconstructed error-correcting codes.

11. The content distribution method according to claim 1, wherein, when a retry for the packets occurs, the sending distribution requests a server apparatus that is different from a server apparatus that has caused the retry to distribute the packets relevant to the retry.

12. A non-transitory computer-readable medium encoded with computer executable instructions, wherein the instructions, when executed by a processor, cause the processor to execute a method comprising:

sending distribution requests to a plurality of server apparatuses via a network, the distribution requests requesting distribution of a piece of content data in a distributed manner on a packet basis; and playing back the piece of content data by assembling packets distributed in the distributed manner from the plurality of sever apparatuses in response to the distribution requests sent in the sending distribution requests;

wherein the sending distribution requests includes dividing the piece of content data into a plurality of blocks, dividing a block of the plurality of blocks into a plurality of packets, defining a plurality of areas of the block, each area being a subset of packets of the plurality of packets, assigning each area of the plurality of areas to a server apparatus of the plurality of server apparatuses, specifying a respective transfer rate individually for each of the plurality of areas, the specifying the including setting a transfer rate for each server apparatus to transfer each area;

transmitting distribution requests for respective areas of each of the plurality of blocks to the assigned server apparatus, detecting a ratio of packets received to total packets sent by a corresponding server apparatus, decreasing a transfer rate of the corresponding server apparatus to a non-zero transfer rate if the ratio detected for the corresponding server apparatus falls below a threshold, and reassigning only some of the areas assigned to the corresponding server apparatus to another server apparatus if the transfer rate of the corresponding server apparatus is decreased and maintaining another portion of the areas assigned to the corresponding server apparatus, the playing back includes reconstructing the plurality of blocks on the basis of the plurality of packets contained in the plurality of areas distributed from the plurality of sever apparatuses in response to the distribution requests sent in the sending distribution requests.

13. An information processing apparatus, comprising:

means for sending distribution requests to a plurality of server apparatuses via a network, the distribution requests requesting distribution of a piece of content data in a distributed manner on a packet basis; and means for playing back the piece of content data by assembling packets distributed in the distributed manner from the plurality of server apparatuses in response to the distribution requests sent by the means for sending distribution requests;

wherein the means for sending distribution requests includes means for assigning a plurality of areas of each of a plurality of blocks formed by dividing the piece of content data to the plurality of server apparatuses, the plurality of areas being defined by dividing each of the plurality of blocks on the packet basis in association with the plurality of server apparatuses, means for requesting block areas and for sending distribution requests for the plurality of areas of each of the plurality of blocks formed by the means for requesting block areas to the plurality of server apparatuses, means for specifying a respective transfer rate individually for each of the plurality of areas, the means for specifying setting a transfer rate for each server apparatus to transfer each area;

means for decreasing a transfer rate of the corresponding server apparatus to a non-zero transfer rate if the ratio detected for the corresponding server apparatus falls below a threshold, and means for reassigning only some of the areas assigned to the corresponding server apparatus to another server apparatus if the transfer rate of the corresponding server apparatus is decreased and maintaining another portion of the areas assigned to the corresponding server apparatus, means for increasing a transfer rate of the corresponding server apparatus if the ratio detected for the corresponding server apparatus exceeds a threshold, and the means for playing back includes means for reconstructing the plurality of blocks on the basis of the plurality of areas distributed from the plurality of server apparatuses in response to the distribution requests sent by the means for requesting block areas.

14. An information processing apparatus, comprising:

a distribution requesting unit including a central processing unit and configured to send distribution requests to a plurality of server apparatuses via a network, the distribution requests requesting distribution of a piece of content data in a distributed manner on a packet basis; and a playback unit configured to play back the piece of content data by assembling packets distributed in the distributed manner from the plurality of server apparatuses in response to the distribution requests sent by the distribution requesting unit;

wherein the distribution requesting unit includes a block-area assigning unit configured to assign a plurality of areas of each of a plurality of blocks formed by dividing the piece of content data to the plurality of server apparatuses, the plurality of areas being defined by dividing each of the plurality of blocks on the packet basis in association with the plurality of server apparatuses, a block-area requesting unit configured to send distribution requests for the plurality of areas of each of the plurality of blocks formed by the block-area assigning unit to the plurality of server apparatuses, and a transfer rate setting unit configured to specify a respective transfer rate individually for each of the plurality of blocks, the transfer rate setting unit setting a transfer rate for each server apparatus to transfer each area, the transfer rate setting unit configured to detect a ratio of packets received at the client apparatus to total packets sent by a corresponding server apparatus, to decrease a transfer rate of the corresponding server apparatus to a non-zero transfer rate if the ratio detected for the corresponding server apparatus falls below a threshold, and to reassign only some of the areas assigned to the corresponding server apparatus to another server apparatus if the transfer rate of the corresponding server apparatus is decreased and to maintain another portion of the areas assigned to the corresponding server apparatus; and the playback unit includes a block reconstructing unit configured to reconstruct the plurality of blocks on the basis of the plurality of areas distributed from the plurality of server apparatuses in response to the distribution requests sent by the block-area requesting unit.

15. The content distribution method according to claim 1, wherein the plurality of server apparatuses includes two servers.

16. The content distribution method according to claim 14, wherein the transfer rate setting unit increases a transfer rate for a server that did not have an error in a previous transfer of the server.

* * * * *